Oct. 28, 1930.  N. B. HAFLEIGH  1,780,128
BONE SAWING MACHINE
Filed Aug. 31, 1928    5 Sheets-Sheet 4

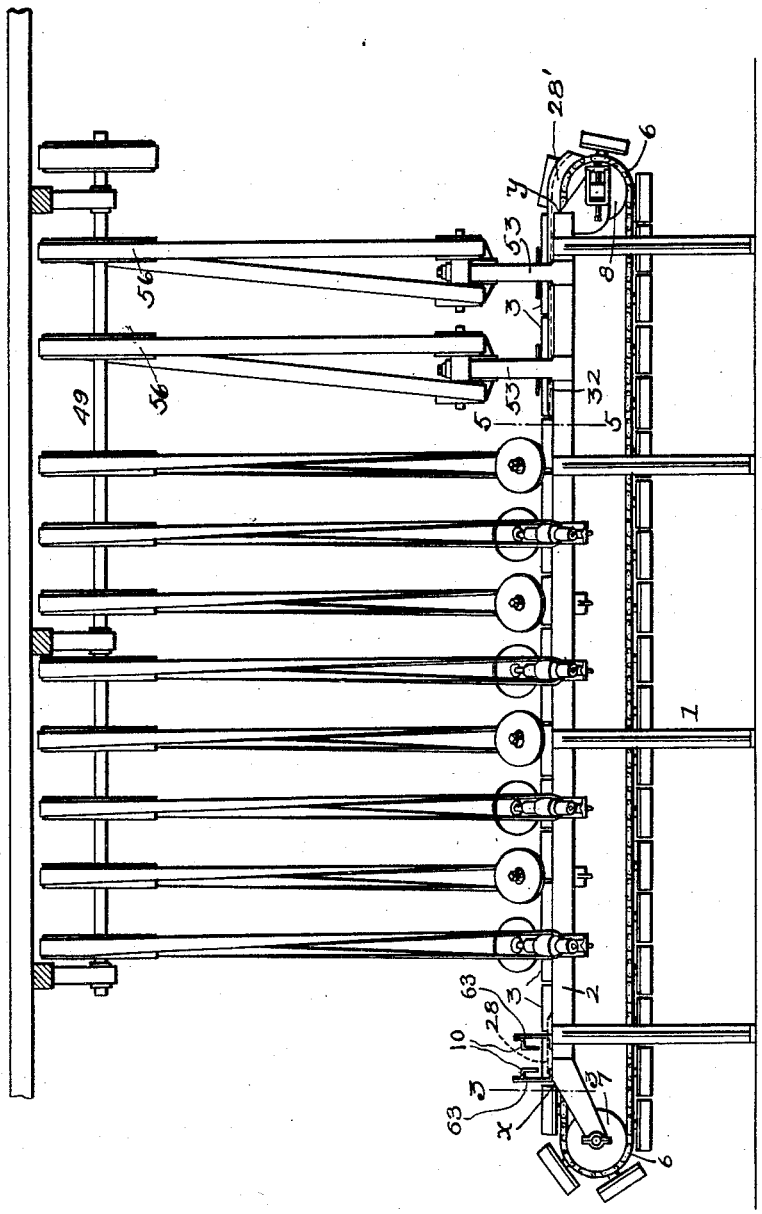

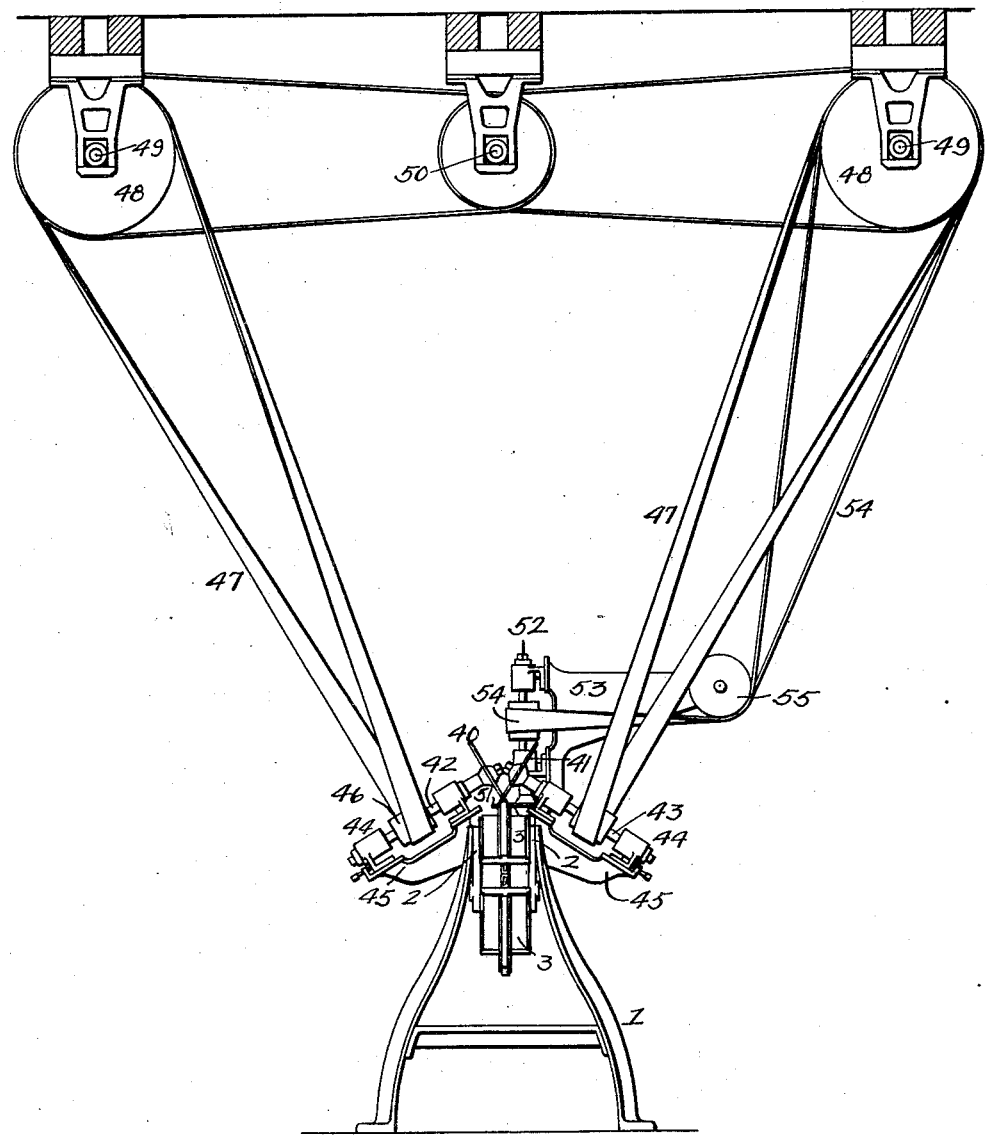

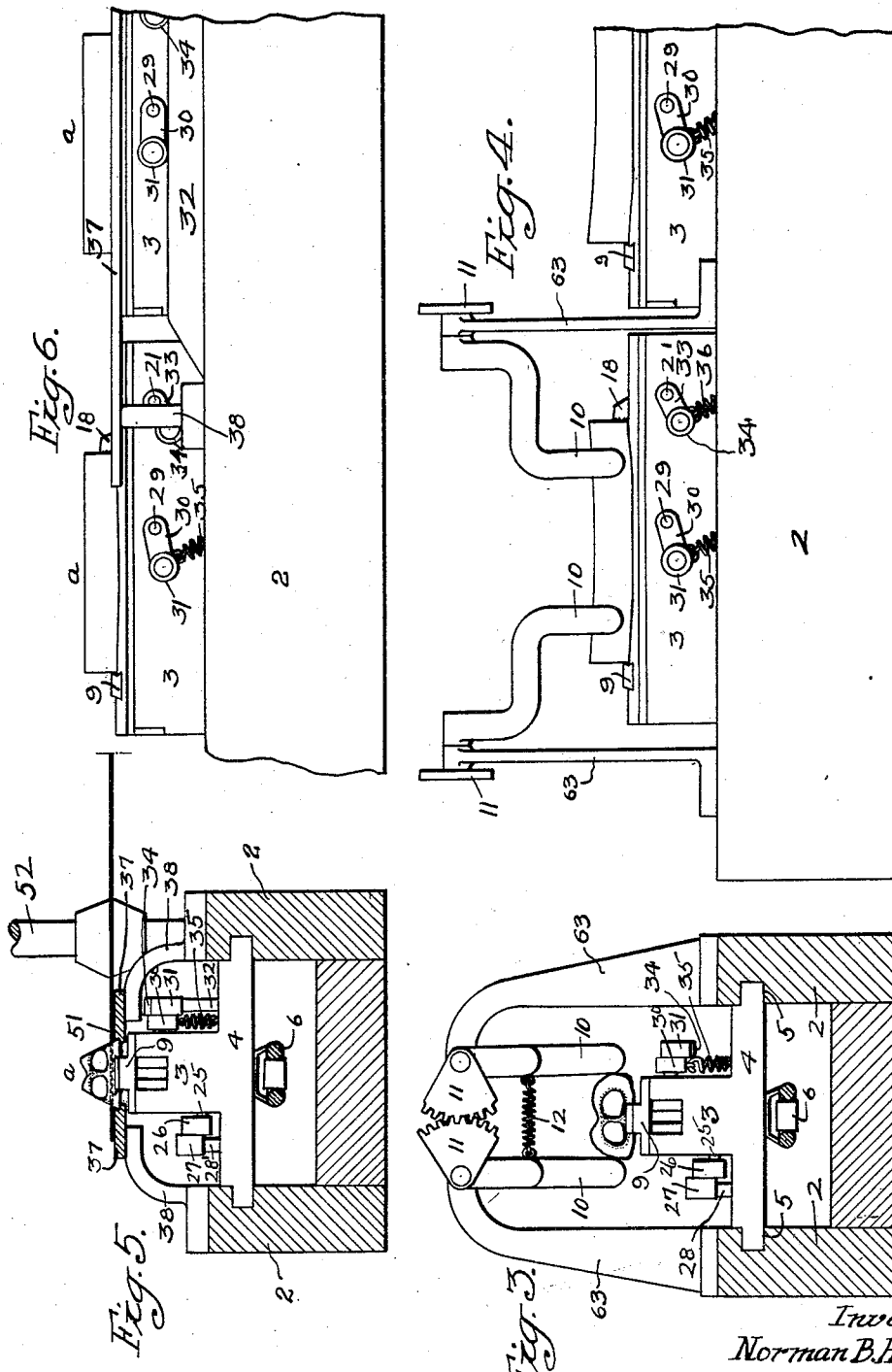

Inventor,
Norman B. Hafleigh,
by his Attorneys,
Howson & Howson

Oct. 28, 1930.  N. B. HAFLEIGH  1,780,128
BONE SAWING MACHINE
Filed Aug. 31, 1928  5 Sheets-Sheet 5
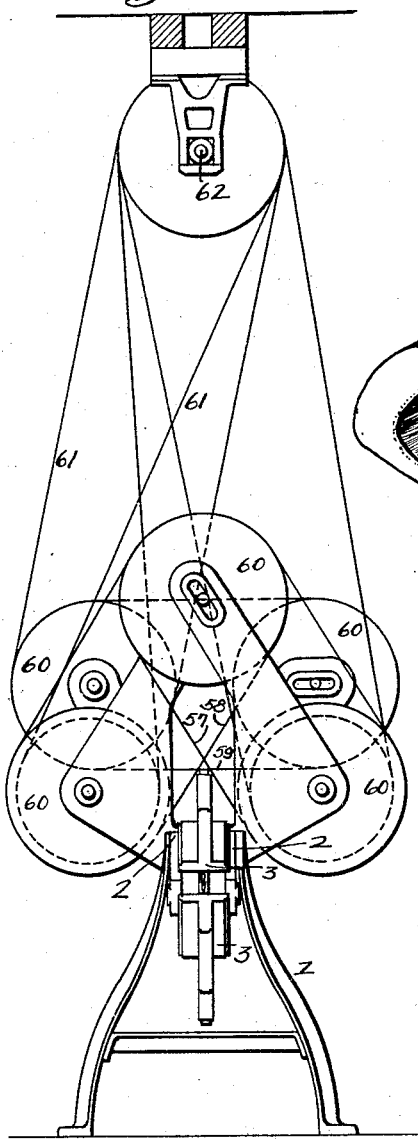
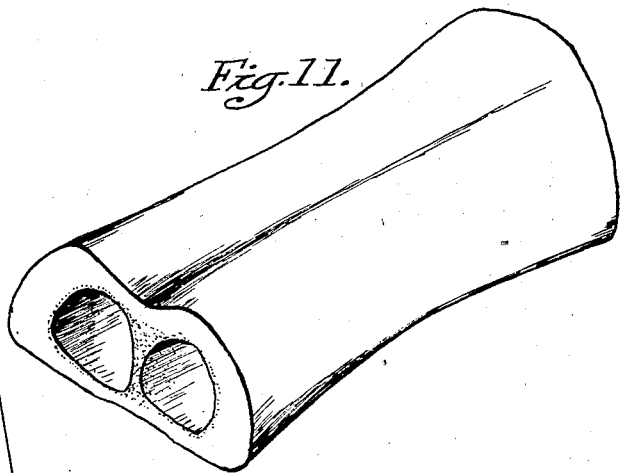
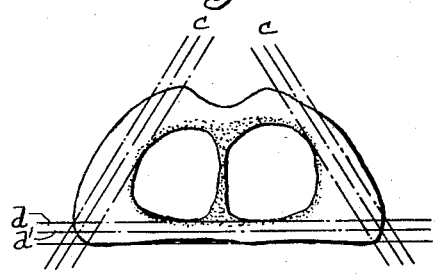
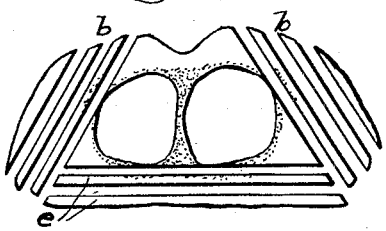
Inventor,
Norman B. Hafleigh,
by his Attorneys, Patented Oct. 28, 1930

1,780,128

UNITED STATES PATENT OFFICE

NORMAN B. HAFLEIGH, OF PHILADELPHIA, PENNSYLVANIA

BONE-SAWING MACHINE

Application filed August 31, 1928. Serial No. 303,321.

One object of my invention is to provide a machine for sawing bones used in the manufacture of buttons and like articles, which will progressively cut the bone as it is fed through the machine.

A still further object of the invention is to provide a machine with a series of saws and an endless chain or belt having bone carriers, so that as the bones are fed through the machine the saws will cut the bones into strips or slabs.

The invention relates also to details of construction of the carriers.

In the accompanying drawings:

Fig. 1 is a side view of my improved bone cutting machine;

Fig. 2 is an end view showing one method of driving the saws;

Fig. 3 is a sectional view on the line 3—3 of Fig. 1 showing the method of centering the bones in the carriers;

Fig. 4 is a side view of the same;

Fig. 5 is a sectional view on the line 5—5 of Fig. 1 showing the means of keeping the partly cut bone in line while making horizontal cuts;

Fig. 6 is a side view of the device shown in Fig. 5;

Fig. 11 is a perspective view, showing one type of bone used in the manufacture of buttons;

Fig. 12 is a diagrammatic view of the saw kerfs in dotted lines;

Fig. 13 is a diagrammatic view showing the different slabs of a bone separated after being cut; and Fig. 14 is an end view of a modification of the invention showing the use of band saws in place of circular saws.

Figure 7:
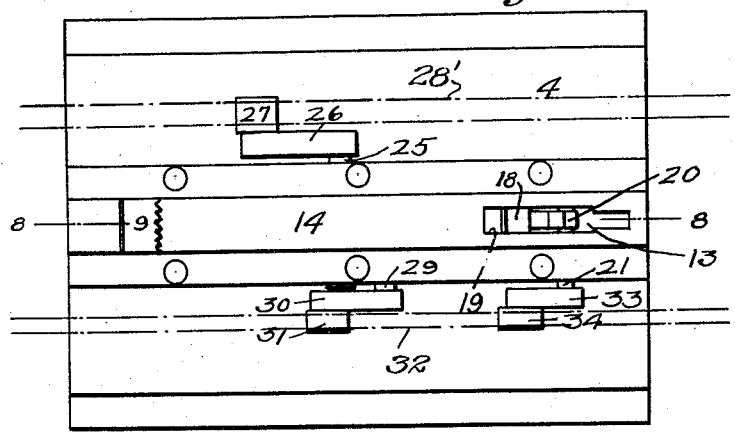
Fig. 7 is a plan view of one of the carriers.

1 is the frame of the machine on which are guides 2 for the carriers 3 shown in detail in Figs. 7 to 10 inclusive. The base 4 of each carrier extends into slots 5 in the guides 2 and enters the slots at the point $x$, Fig. 1, and leaves the slots at point $y$ in said figure. The carriers are secured to an endless chain 6, in the present instance, which passes around sprocket wheels 7 and 8. The sprocket wheel 8 is the driven wheel, and may be driven in any suitable manner.

After a carrier enters the guides 2, a bone is placed on the carrier against the fixed jaw 9. The bone is then passed between two guide arms 10 which center the bone on the carrier. The centering arms are geared together by segments 11, Fig. 3, which intermesh and are pivotally mounted on supports 63 carried by the guides 2, and they are yieldingly held against the bone by a spring 12. A slot 13 extends throughout the length of each carrier and is closed by a cap plate 14, and in the slot is a slide 15. A spring 16 is attached to a fixed plate $16^a$ at one end of the slot and is also attached to the slide and tends to retract the slide.

Figure 9:
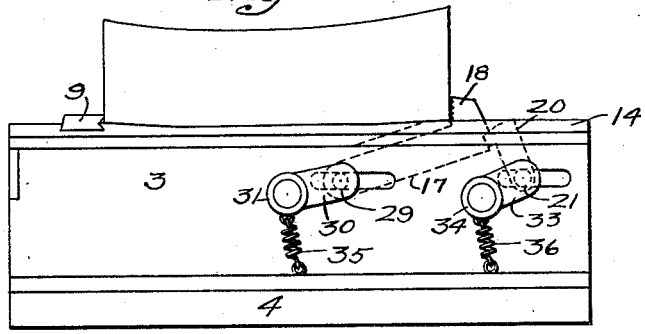
Fig. 9 is a side view of one of the carriers.
Figure 10:
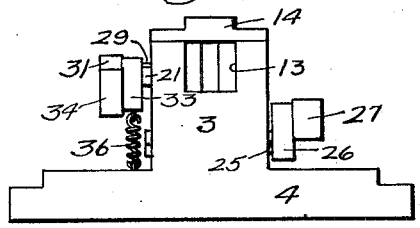
Fig. 10 is an end view of one of the carriers.

Carried by the slide is a movable jaw 17 having a tooth-gripping head 18 which is normally projected through a slot 19 in the plate 14 by the action of the spring 35 so as to grip the bone as illustrated in Fig. 9.

Also carried by the slide 15 is a locking dog 20 which is pivoted at 21 and which engages a notch 22 in the jaw 17 when in its normally elevated position, as shown in Fig. 9, holding the movable jaw in its raised position. The spring 16 of the slide holds the bones rigidly against the fixed jaw 9.

Figure 8:
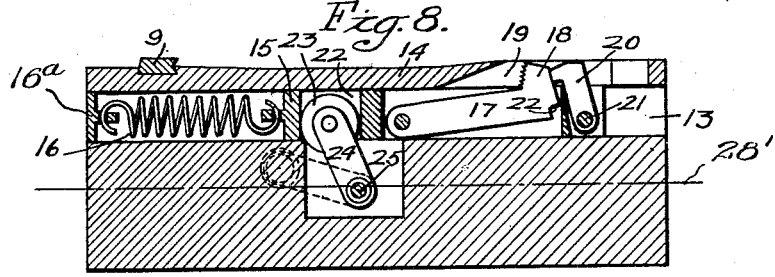
Fig. 8 is a sectional view on the line 8—8 of Fig. 7 of one of the carriers.

Within the slide 15 is a slot 22 in which is located a roller 23. This roller is mounted on an arm 24 on a shaft 25 having at its outer end an arm 26 on which is a roller 27, which is in the path of the cams 28 and 28′ preferably located on the same side of the machine, the cam 28 being on the front part of the machine and located so that the roller 27 begins to ride upon it at the instant that the carrier reaches the point indicated at $x$ in Fig. 1. The cam 28′ is on the rear of the machine and is so located that the roller 27 begins to ride upon it just at the instant that the carrier has passed the side saws and just before the horizontal saws begin to cut. The purpose of the cam 28 is to lift the roller 27 just as the carrier reaches the point $x$ in Fig. 1, thereby raising the arm 26 and causing the arm 24 and roller 23 to move the slide 15 (Figs. 7 and 8). The movement of the slide 15 causes the gripping head 18 of the jaws 17 to be moved a further distance from the fixed jaw 9 so that a bone may be inserted in the space between the two jaws. As soon as the carrier carries the roller 27 beyond the cam 28, the spring 16 retracts the slide 15, carrying the head 18 against the bone. The bone is then held firmly on the carrier until it passes the series of side saws and reaches the horizontal saws.

The movable jaw 17 is mounted on a spindle 29 on which is an arm 30 having a roller 31 which is in the path of a cam 32, in this instance, located at the back of the last side saw on the side of the machine opposite to that on which the cam 28' is located and extends to the end of the machine. The cams 28' and 32 are of substantially the same length so that their times of action are equal and both begin to function at the same instant. On the spindle 21 of the locking dog 20 is an arm 33 having a roller 34 which is also in the path of the cam 32. The spring 35 tends to raise the movable jaw while the spring 36 tends to yieldably hold the locking dog in engagement with the jaw 17. The cam 32 tends to move the rollers 34 and 31 so that the locking dog 20 disengages the gripping head 18 and the gripping head is caused to move below the cap plate 14 as indicated in Fig. 8, while the carriers pass the horizontal saws. After the side saws have made their cuts, then the bone shown at $a$ is held centrally by guides 37, as indicated in Figs. 5 and 6. These guides are mounted on brackets 38, 38, so that when the bone blanks pass into the guides, the rollers 34 and 31 of the locking dog 20 and the movable jaw 17, respectively, ride upon the cam 32, the roller 34 striking the cam ahead of the roller 31 to move the dog 20 from the movable jaw 17. The jaw 17 will then be retracted by the cam 32 as the roller 31 rides upon it. Simultaneously, the cam 28', on the opposite side of the machine, actuates roller 27, causing the arms 26 and 24 to actuate the roller 23, which again moves the slide 15, causing the gripping head 18 to release the bone. The bone is then pushed by the fixed jaw 9 and guided laterally by the guide 37 while passing the horizontal saws.

After the side saws cut the slabs $b$ from the blank it is left in triangular shape and sufficient bone is left at the bottom to allow one or two slabs $e$ to be cut therefrom. As the triangular blank enters the space between the two guides 37, 37, the beveled edges of the blank extend into beveled slots in the guides as shown in Fig. 5, and as the blank is carried past the first horizontal saw a kerf $d$ is cut and the triangular hollow piece is then discharged as waste. If it is desired to make another slab then the thick slab which is still on the carrier is severed on the line $d'$ and the last slab is finally released at the discharge end of the machine.

The slabs are discharged from the machine as soon as cut and are collected in suitable boxes or other receptacles.

As shown in Figs. 1 and 2, the saws 40 and 41 are mounted on mandrels 42 and 43 respectively. The mandrels are mounted on bearings 44. The bearings 44 are supported by brackets 45 on each side of the machine and the mandrel is set at such an angle that the different slabs $b$, $b$ of the bone, Fig. 3, will be cut on the lines $c$, $c$, Fig. 12. It will be understood that the angular position of these saws will be varied according to the type of bone being cut.

On each spindle 42 is a pulley 46 in the present instance driven by a belt 47 which passes around pulleys 48 on shafts 49 mounted on suitable hangers. These shafts are driven from the central drive shaft in the present instance. The horizontal saws 51 are mounted on vertical mandrels 52 which are adapted to bearings on the brackets 53. A belt 54 passes around a pulley on each mandrel, around guide pulleys 55 and around the pulley 56 on one of the driven shafts 49, as clearly shown in Fig. 2. The saws of each of the groups 40, 41 and 51 are staggered in the groups, that is to say each saw of each group is staggered with relation to the remainder thereof to an extent producing a slab of the desired thickness.

The two horizontal saws shown make the two cuts $d$, $d'$ at the bottom of the bone blank, and produce the slabs $e$, $e$, Fig. 13.

In Figs. 1 and 2, I have illustrated circular saws for making the cuts, but in Fig. 4 I have shown band saws 57, 58 and 59 which pass around guide pulleys 60 driven by belts 61 which in turn pass from pulleys on the driven shaft 62. While in Figs. 1 and 2, the machine is equipped with band saws, it may in some instances be equipped with both circular saws and band saws, if found desirable.

The operation of the machine is as follows: Referring to Figs. 1 and 2, the bones, such as shown in Fig. 11, are cut to the proper length and are placed in the machine by hand in the present instance, each bone resting on an independent carrier. The bone is centered as described above and clamped onto the carrier by the fixed and movable jaws. The bone is fed past the first set of saws which trim the ends of the bone, the ends being of a greater width usually than the center, the second set of saws make a second cut and produce one of the slabs $b$. The third set of saws make the third cut and produce another slab $b$, Fig. 13.

After the carrier with the bone leaves the angular jaws then the movable jaw is released from the bone by the action of cam 28' on the roller 27 and simultaneously is retracted below the surface of the cap plate 14 by the action of cam 32 on the rollers 34 and 31 respectively and the blank is pushed through guides to the horizontal saws which cut the slabs e to form the triangular piece from the blank and this triangular piece is discharged as waste, the lower slab e being held in the carrier until it is discharged at the end of the machine.

While I have shown only one modification, for purposes of illustration and description, it will be apparent to those skilled in the art that other changes and modifications may be made without departing from the scope of the invention and I, therefore, desire to be limited only by the scope of the appended claims.

I claim:

1. The combination in a machine for sawing bones, of a frame; an endless chain; sprocket wheels around which the chain passes; means for driving the chain; a series of carriers mounted on the chain, each carrier having a fixed and movable jaw; cams for releasing and retracting the movable jaw and means for projecting the said movable jaw and locking the jaw in the projected position; and a series of angular saws on each side of the machine and a subsequent series of horizontal saws to cut the series of slabs from the sides and the bottom of the bone.

2. The combination in a machine for sawing bones, of a series of carriers for the bones; means for feeding the carriers through the machine; guides for the carriers, each carrier having a fixed and movable jaw; means at the feed end of the machine for moving each movable jaw a predetermined distance from each fixed jaw as the carriers enter the feed end of the machine so that a bone may be placed between each pair of said jaws; a centering device for centering the bones on the carriers; means for clamping the movable jaw against the bones after they have been centered; means for sawing the bones angularly and horizontally as they are held by the carriers; and means for releasing and retracting the movable jaw at the instant the horizontal cut is to be made so that it clears the horizontal sawing means.

3. The combination in a bone sawing machine, of a series of carriers; means for feeding the carriers through the machine; guides for the carrier; a fixed and movable jaw on each carrier; a locking dog for the movable jaw; an arm on the movable jaw and an arm on the locking dog; a cam in the path of said arms for releasing the dog and withdrawing the movable jaw; and a series of saws arranged to cut strips from the body of the bone.

4. The combination in a machine for sawing bones, of a series of carriers on which the bones are mounted; saws for cutting slabs from the bones, each carrier having a fixed and a movable jaw; a slide mounted in each carrier; a spring for retracting the slide, said movable jaw being pivoted on the slide; an arm engaging the slide; a cam engaging the arm to move the slide against the tension of the spring to increase the space between the fixed and movable jaw so as to allow a bone to be inserted between the jaws; and means for raising the movable jaw so as to engage the bone.

5. The combination in a bone sawing machine, of a frame; a series of side saws; a horizontal saw; an endless chain; a series of carriers on the chain; fixed and movable jaws on the carriers, the jaws holding the bones while the side saws are cutting; means for releasing and retracting the movable jaws below the level of the upper surface of the carriers just before the horizontal saw begins to cut; and side guides, the fixed jaw pushing the bone blank through the guides while the horizontal saw is cutting, said fixed jaw being sufficiently below the horizontal saw to clear it.

6. In a machine for slab-cutting articles having an unusable central portion extending longitudinally from end to end thereof, a series of saws disposed in angularly related groups, the saws of each group being offset with relation to other saws of the same group to produce slabs of desired thickness and means for longitudinally moving the articles through said series of saws.

7. In a machine for slab-cutting articles having a plurality of longitudinally-extending angularly related usable portions grouped about a longitudinally-extended unusable portion, a carrier including parts grasping opposite ends of one usable portion for moving the article along a fixed path and a group of saws for each remaining usable portion disposed along said fixed path and positioned to intersect and cut the article as it moves therealong, the saws of each group being offset with relation to the remaining saws of the group.

8. In a machine for slab-cutting articles having a plurality of longitudinally-extending angularly related usable portions grouped about a longitudinally-extending unusable portion, a carrier including parts grasping opposite ends of one usable portion for moving the article along a fixed path, a group of saws for each remaining usable portion disposed along said fixed path and positioned to intersect and cut the article as it moves therealong, the saws of each group being offset with relation to the remaining saws of the group, and a saw for subsequently engaging the article as it moves along said path and severing said unusable portion from the usable portion engaged by the carrier.

9. The combination in a bone-sawing machine of a series of side saws and a horizontal saw, a series of carriers, means for feeding the carriers through the machine, each carrier having movable and fixed jaws for clamping the bones, a slide on which the movable jaw is mounted, a spring attached to the slide for clamping the movable jaw against the bone, a cam in advance of said saws operatively engaging the slide to shift the same and position the movable jaw for insertion of a bone to the carrier, a cam rearwardly of the side saws and in advance of the horizontal saw for withdrawing the movable jaw below the upper surface of the carrier, and means for guiding the lower portion of the bone during its passage by the horizontal saw, the fixed jaw of the carrier pushing the bone during its passage by said horizontal saw.

NORMAN B. HAFLEIGH.